US006606307B1

(12) United States Patent
Chang et al.

(10) Patent No.: US 6,606,307 B1
(45) Date of Patent: Aug. 12, 2003

(54) TECHNIQUES FOR UTILIZATION OF BANDWIDTH SPACE ASSETS

(75) Inventors: Donald C. D. Chang, Thousand Oaks, CA (US); Kar W. Yung, Torrance, CA (US); David C. Cheng, Palos Verdes Estates, CA (US); Urban A. Von Der Embse, Los Angeles, CA (US); John I. Novak, III, West Hills, CA (US); Frank A. Taormina, El Segundo, CA (US); Ming U. Chang, Rancho Palos Verdes, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/432,439

(22) Filed: Nov. 2, 1999

Related U.S. Application Data

(60) Provisional application No. 60/125,731, filed on Mar. 23, 1999.

(51) Int. Cl.[7] .............................................. H04B 7/185
(52) U.S. Cl. ........................................ 370/316; 455/12.1
(58) Field of Search ............................... 370/316, 310, 370/315, 319, 322, 323, 320; 455/12.1, 427, 430, 431, 447, 448, 450, 452, 464, 13.2

(56) References Cited

U.S. PATENT DOCUMENTS

| | | | |
|---|---|---|---|
| 4,637,017 A | | 1/1987 | Assal et al. |
| 5,319,673 A | * | 6/1994 | Briskman ....................... 375/1 |
| 5,722,042 A | | 2/1998 | Kimura et al. |
| 5,757,767 A | * | 5/1998 | Zehavi ........................ 370/208 |
| 5,764,189 A | | 6/1998 | Lohninger |
| 5,765,098 A | * | 6/1998 | Bella ......................... 455/13.3 |
| 5,828,339 A | | 10/1998 | Patel |
| 5,839,053 A | * | 11/1998 | Bosch et al. ................ 455/13.1 |
| 5,890,679 A | | 4/1999 | Chethik |
| 5,896,107 A | | 4/1999 | Huynh |
| 5,924,014 A | | 7/1999 | Vanden Heuvel et al. |
| 5,995,041 A | * | 11/1999 | Bradley et al. .............. 342/357 |
| 6,301,313 B1 | * | 10/2001 | Grevargiz et al. .......... 375/340 |
| 6,314,269 B1 | * | 11/2001 | Hart et al. .................. 455/12.1 |
| 6,333,924 B1 | | 12/2001 | Porcelli et al. |
| 6,337,980 B1 | * | 1/2002 | Chang et al. ............... 455/430 |
| 6,496,146 B1 | | 12/2002 | Chang et al. |
| 6,501,941 B1 | | 12/2002 | Chang et al. |

OTHER PUBLICATIONS

Dr. Carson E., Agnew et al., "The AMSC Satellite System", Proceedings of the Mobile Satellite Conference, JPL Publications 88–9, May 305, 1988, pp. 3–9.

Dr. Dariush Divsalar, "Trellis Coded MPSK Modulation Techniques for MSAT–X", Proceedings of the Mobile Satellite Conference, JPL Publication 88–9, May 3–5, 1988, pp, 283–290.

U.S. patent application Ser. No. 09/546,929, Von der Embse et al., filed Apr. 11, 2000.

U.S. patent application Ser. No. 09/376,942, Chang et al., filed Aug. 18, 1999.

U.S. patent application Ser. No. 09/432,440, Chang et al., filed Nov. 2, 1999.

* cited by examiner

Primary Examiner—Lester G. Kincaid
Assistant Examiner—Naghmeh Mehrpour
(74) Attorney, Agent, or Firm—V. D. Duraiswamy; M. W. Sales (57) ABSTRACT

Methods for operating a satellite constellation are disclosed that utilize spatial diversity and directional gain antennas at ground terminal locations to provide multiple data rate services on a single frequency channel. One method comprises receiving a signal at a first and second satellite in the satellite constellation from a first communications device. A communications channel at a first frequency from the first satellite is used to communicate with the first communications device. A signal from a second communications device is received only at the second satellite at the first frequency, and the second satellite is used to communicate with the second communications device at the first frequency without substantially interfering with the communications with the first communications device.

34 Claims, 8 Drawing Sheets

TECHNIQUES FOR UTILIZATION OF BANDWIDTH SPACE ASSETS

CROSS-REFERENCE TO RELATED APPLICATIONS

This application claims the benefit under 35 U.S.C. §119 (e) of U.S. patent application Ser. No. 60/125,731, entitled "IDENTIFICATION OF GROWTH LIMITS FOR AND TECHNIQUES TO FULLY UTILIZE SPACE ASSETS FOR MOBILE COMMUNICATIONS," filed on Mar. 23, 1999, by Donald C. D. Chang, et al, and is related to the following applications:

Application Ser. No. 09/432,440, entitled "METHOD FOR IDENTIFYING GROWTH LIMIT OF HANDHELD SERVICES FOR MOBILE SATELLITE COMMUNICATIONS," filed on Nov. 2, 1999, by Donald C. D. Chang, et al., which application is hereby incorporated by reference herein.

BACKGROUND OF THE INVENTION

1. Field of the Invention

This invention relates in general to satellite communications, and, in particular, to techniques for fully utilizing the bandwidth capabilities of space assets.

2. Description of Related Art

Communications satellites are in widespread use. The communications satellites are used to deliver television and communications signals around the earth for public, private, and military uses.

The primary design constraints for communications satellites are antenna beam coverage and radiated Radio Frequency (RF) power. These two design constraints are typically thought of to be paramount in the satellite design because they determine which customers on the earth will be able to receive satellite communications service.

Satellite weight is also a factor, because launch vehicles are limited as to how much weight can be placed into orbit. Lower orbits, such as Low Earth Orbit (LEO), and Medium Earth Orbit (MEO), also known as Intermediate Circular Orbit (ICO) do not require as large of a launch vehicle per pound of satellite weight, but LEO and MEO satellites are also weight limited. Since launch costs are large, the satellite must be utilized as much as possible in order to make the satellite commercially viable. If there is not enough usage of the satellite, the satellite manufacturer or the satellite owner will not be able to recoup the financial outlay for the satellite, thus decreasing the available worldwide communications links.

Proper selection of beam coverage, radiated RF power, and weight do not guarantee that the satellite services, also known as "space assets," are utilized in an efficient or complete manner. For example, the fact that a satellite transponder channel has enough radiated RF power supplied by an RF amplifier, and the satellite has a proper antenna to direct the transponder channel to a given area on the earth's surface, does not guarantee full utilization of the transponder signal. The bandwidth of the signal must be reviewed, analyzed, and configured to fully utilize the transponder channel to maximize the usage of the space asset, i.e., the transponder channel.

From the foregoing, it can be seen that there is a need in the art for techniques to review, analyze, and configure a satellite to fully utilize the services provided by the satellite. It can also be seen that there is a need in the art to provide more complete utilization of space assets without dramatically increasing weight. There is also a need in the art to provide more complete utilization of space assets without dramatically increasing the cost of manufacturing and operating a satellite.

SUMMARY OF THE INVENTION

To overcome the limitations in the prior art described above, and to overcome other limitations that will become apparent upon reading and understanding the present specification, the present invention discloses methods for operating a satellite constellation that utilize spatial diversity and directional gain antennas at ground terminal locations to provide multiple data rate services on a single frequency channel.

One method comprises receiving a signal at a first and second satellite in the satellite constellation from a first communications device. A communications channel at a first frequency from the first satellite is used to communicate with the first communications device. A signal from a second communications device is received at the second satellite at the first frequency, and the second satellite is used to communicate with the second communications device at the first frequency without substantially interfering with the communications with the first communications device.

An object of the present invention is to provide techniques to review, analyze, and configure a satellite to fully utilize the space assets of the satellite. Another object of the present invention is to provide more complete utilization of space assets without dramatically increasing weight. Still another object of the present invention is to provide more complete utilization of space assets without dramatically increasing the cost of manufacturing and operating a satellite.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Overview

Communications satellites are typically thought of as power limited, e.g., the spacecraft can only deliver a certain amount of Effective Incident Radiated Power (EIRP) over a given area on the earth's surface. The power limitation constraint ensures the validity and consistency of the communications link between the earth's surface and the satellite, but does so by sacrificing the satellite's bandwidth capabilities.

The present invention describes techniques to make mobile satellite communications operations more effective and more profitable for satellite operators without altering the satellite space assets or satellite services. Typical mobile satellite systems operate in power limited states, and are not effective in bandwidth utilization. The techniques of the present invention are cost effective for satellite operators as well as satellite users.

The techniques of the present invention allow present and future satellites, e.g., LEO/MEO mobile communications operators, to provide low cost global medium speed data transport while shifting the space asset operations into more power and bandwidth efficient states. Further, geosynchronous satellite operators can reap similar benefits when regional voice and low speed data transport requires more than one satellite in the same region.

The most precious elements of satellite services for mobile communications are RF power and frequency spectrum. Most of mobile satellite communications designs today have become more efficient than before via multiple beam payloads on each satellite. As a result, high gain beams deliver more EIRP with less RF power from satellites. In addition, frequency spectrum can be reused many times through beam isolation.

However, the majority of targeted mobile users on ground will use handsets, which provide voice and low speed digital data transfer. Handset designs usually feature omnidirectional antennas to eliminate directional tracking requirements by telephone communications systems. However this feature of handset design will prevent mobile users in the same geographical area from using the same spectrum through different satellites. This elimination of bandwidth from neighboring satellites is caused by the inadequate spatial isolation between handsets, which is a direct result of use of omnidirectional antennas in the handset design. When there at are two or three satellites within the Field-Of-View (FOV) of nearby users, 50% or 66.7% of the potentially available spectrum (bandwidth) can not be used, respectively, because the first mobile user effectively "blocks" the neighboring satellites from using that spectrum for any other purpose. The inefficiency of the system grows as the number of satellites within a given FOV increases. As a result, the hard-earned available bandwidth created by advanced designs in the space assets through frequency reuse cannot be fully utilized by the mobile operators. Only the RF power can be fully utilized but not the available spectrum (bandwidth).

The present invention provides techniques for effective overall resource management, including bandwidth allocation to geographic areas. The techniques used in the present invention balance the utility of various elements of resources through injection of different applications, different users, and different system management techniques. The use of these management techniques of the present invention translate the new additional applications into cost reductions as well as expanding the satellite communications capabilities.

The techniques of the present invention dynamically optimize the total system space assets. A system implementing the techniques of the present invention comprises multiple applications and multiple application data rates. Each application represents a segment that consumes a mixture of resources per user. Every operation point in the multi-dimensional (resource, traffic, and revenue) space indicates a unique mixture of users from all applications. The multi-dimensional space graphs described herein provide operational points that increase the efficiency and decrease the cost outlays for satellite space assets. Linear programming or other similar techniques can be used to identify the optimum operation point for a given space asset. Throughout the remainder of the present application, the space asset is assumed to operate at the optimum operation point, however, the spacecraft can operate at less than optimum operation without deviating from the scope of the present invention.

The present invention also incorporates a wavelet finite impulse response (WFIR) waveform technology. The WFIR technology provides more bandwidth efficient modulation and more tolerance to channel imbalance.

Although the illustrations of the present invention provided herein discuss only Frequency Division Multiple Access (FDMA), Code Division Multiple Access (CDMA) techniques discussed using WFIR waveforms can also be used in conjunction with the present invention to spread information over a larger bandwidth to reduce the required power density over frequencies much lower than those from narrow band voice and digital data.

These techniques when used with the present invention improve the channel packing efficiency and assure that a single set of the filter coefficients for optimum detection can be used for services with different data rates.

Further, a low cost high gain tracking antenna technology for ground terminals can be used with the present invention to provide connectivity between ground users and satellites, and to provide spatial isolation between geographically proximate users to allow simultaneous communications with different satellites at the same frequency. Multiple beams can also be used to achieve this increase in capability, but it is not required to implement the present invention. Ground user terminals with high gain antennas shall require less RF power consumption in the space asset to maintain the communications links having higher data rates. Further, these user terminals with high direction-discrimination capability will enhance overall communications capacities in a given geographical area because more communications links will be available at the same frequency via multiple satellites.

For ease of understanding the principles of the present invention, examples will be described herein using two different applications that require different mixes of resources. The present invention is not limited to two different applications; the application requirements and resource combinations are not limited in terms of bandwidth or space asset allocation, but merely by the number of users that the application and resource combinations can service in a geographic area. Further, the principles of the present invention can be applied to other mobile systems using multiple satellites individually, and among multiple mobile satellite systems using the same frequency bands within a given geographic region.

SATELLITE CONSTELLATION EXAMPLE

Figure 1:
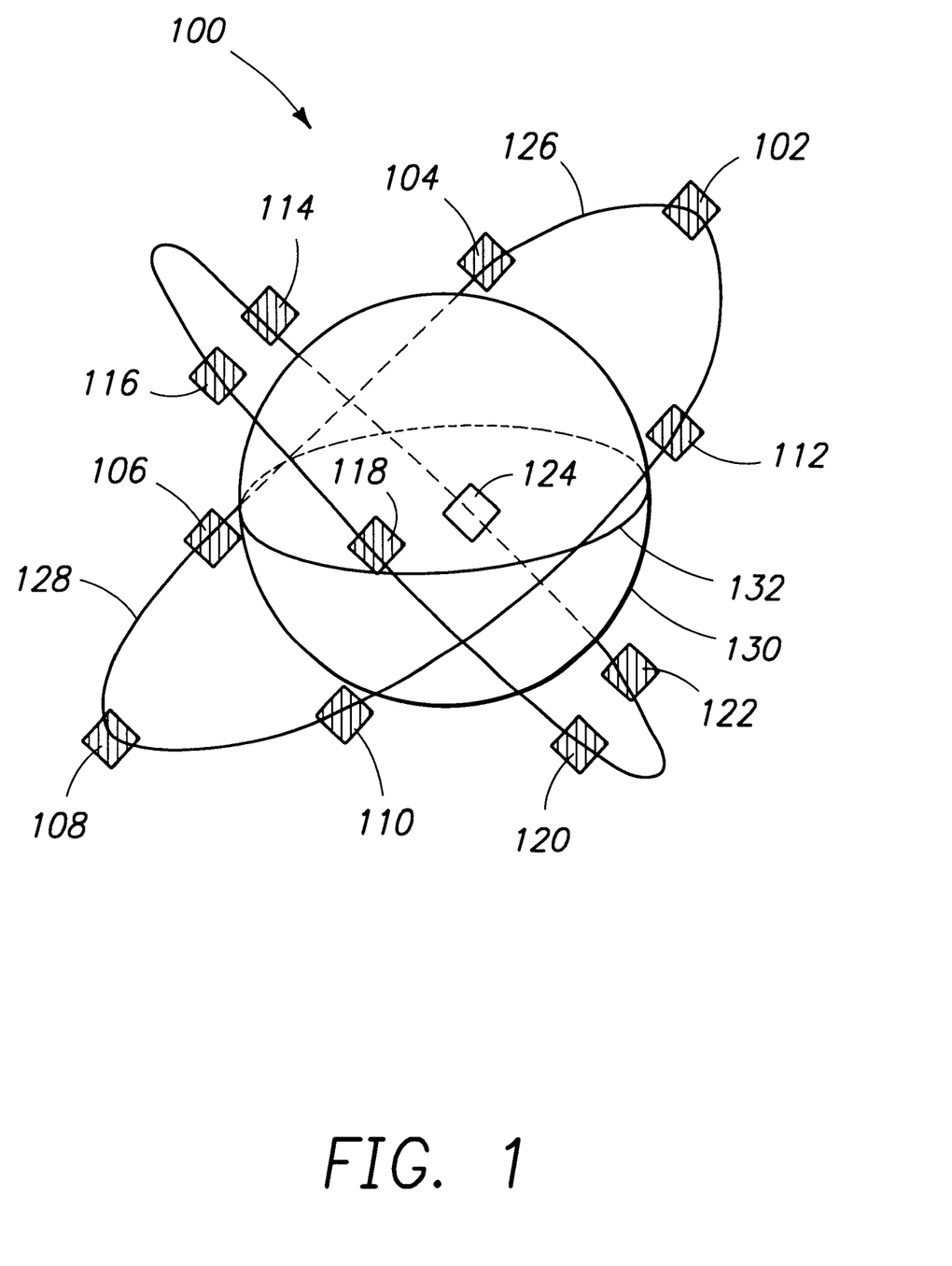
FIG. 1 illustrates a typical satellite constellation that employs the principles of the present invention.

FIG. 1 illustrates a typical satellite constellation that employs the principles of the present invention.

The constellation 100 for a typical global communications network comprises 12 MEO satellites 102–124 in two 45° inclined planar orbits 126 and 128. MEO satellites 102–112 are located in orbit 128 and MEO satellites 114–124 are located in orbit 126. The orbits 126 and 128 are substantially circular and have a radius approximately 10,000 km above the surface of the earth 130. One MEO satellite 102–124 in each orbit 126 and 128 is typically an additional in-orbit spare, but is not required to be a spare MEO satellite 102–124. Thus, the constellation 100 may actually contain 12 operational MEO satellites 102–124, or only 10 MEO satellites 102–110 and 114–122, randomly designating MEO satellites 112 and 124 as the in-orbit spare satellites. MEO satellite 124 is shown unshaded to indicate that it is located on the other side of the earth 130, e.g., substantially opposite MEO satellite 118 in orbit 126. Since there are six MEO satellites 102–124 in two orbits 126 and 128, each orbit contains 6 MEO satellites 102–124 at approximately 60° separations in each orbit 126 and 128.

For a 10 operational satellite constellation 100 as described above, there are 2.5 "visible" MEO satellites 102–110 and 114–122, on average in time and space, by users on the surface of the earth. Visible MEO satellites 102–110 and 114–122 are defined as satellites within the field of view (FOV) of a given longitudinal and latitudinal geographical location, wherein the MEO satellites 102–110 and 114–122 have a minimum elevation angle of 0° for that given geographical location. Users at geographical locations near the equator see slightly more satellites in average than those users at medium latitudes. For a 12 MEO satellite 102–124 constellation 100, the average number a ground based user can see increases to 3 satellites.

The MEO satellites 102–124 provide connectivity to and from about 163 beam positions via a spoke-and-hub architecture. The on-board digital processors on the MEO satellites 102–124 perform the functions of beam-forming, signal channeling & filtering, as well as switching & re-formatting.

Each MEO satellite 102–124 provides a spectral bandwidth at a given RF frequency band, e.g., S-band, C-band, etc. Within each RF frequency band, the bandwidth is divided into smaller portions called subbands, where the subbands are used for communications purposes. Typical divisions of the frequency band would result in 512 subbands each for forward and return links per MEO satellite 102–124, although the frequency band can be divided into a greater or lesser number of subbands if desired. For typical MEO satellites 102–124, 490 out of the 512 subbands are available for subscriber usage and 32 for satellite house keeping functions.

Subband Operation and Usage

Figure 2:
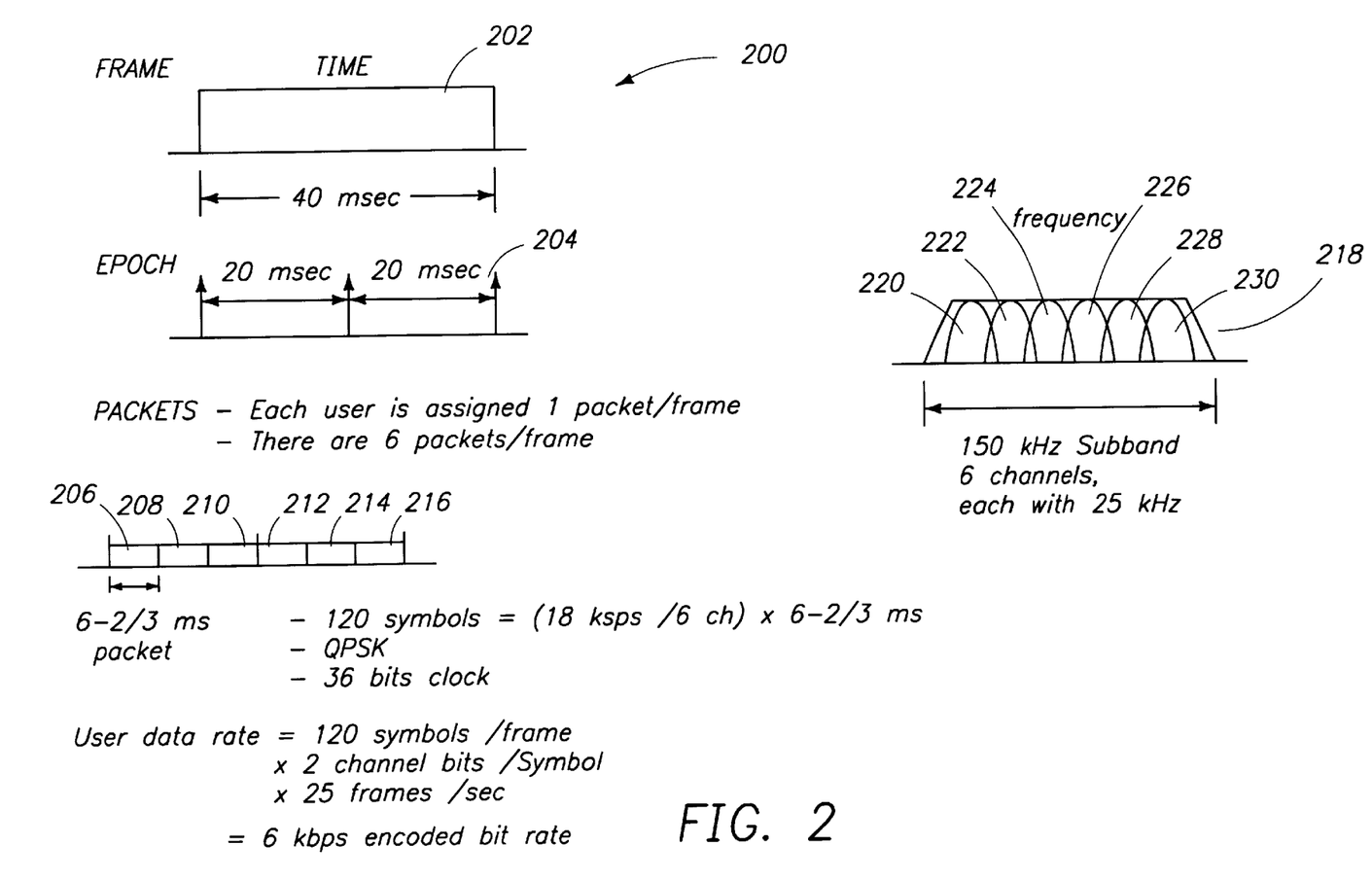
FIG. 2 illustrates the subbands and division of a typical frame of data used by the present invention.

FIG. 2 illustrates the subbands and division of a typical frame of data used by the present invention.

Data structure 200 illustrates a typical frame 202 of communications data. Frame 202 is shown as 40 milliseconds (msec) in length, but can be of greater or lesser duration. Each frame 202 is divided as shown in epoch 204, wherein epoch 204 contains two equal length portions of frame 202.

Within frame 202, packets 206–216 are shown. Each packet 206–216 is 6.67 msec in length and contains 120 symbols. With 120 symbols per frame 202, 2 channel bits per symbol, and 25 frames 202 per second, this is equivalent to a 6 kilobit per second (kbps) bit rate for the data structure 200.

Each packet 202–216 is transmitted in a given frequency band. The frequency band is divided up by frequency into smaller units, called subbands 218. Subbands 218 are bandwidths of signals which are grouped and processed on board the satellites 102–124. The number of subbands 218 on board are digital, non-regenerative repeater payloads and shall be viewed as the bandwidth processing capability of the spacecraft. Each subband 218 is typically 150 kHz in bandwidth. Subbands 218 are flexibly assigned to antenna beam positions and frequency slots within the data structure 200 of the MEO satellite 102–124. Multiple subbands 218 can be assigned to a given antenna beam position, and a single subband 218 can be time-shared by multiple antenna beam positions. Subbands 218 are typically operated in a multi-carrier Time Division Multiple Access (TDMA) mode as described with respect to frame 202 and packets 206–216 above, but can also be operated in a CDMA mode if desired.

Each subband 218 has six 25 kHz channels 220–230. There can be a greater or lesser number of channels 220–230 depending on the Frequency Division Multiple Access (FDMA) schema desired. The six channels 220–230 have a carrier and are TDMA modulated into the six packets 206–216 per frame 202, and thus, the data structure provides up to 36 communication channels simultaneously per frame 202. If the number of packets 206–216 and the number of channels 220–230 change, a greater or lesser number of communication channels would be available for usage.

RFF signals are used to transmit the data structure from the MEO satellite 102–124 back to earth 130. The communication payload on a MEO satellite 102–124 typically consumes about 5.1 kilowatts (kW) power, of which 700 watts are radiated via RF signals through 127 Solid-State Power Amplifiers (SSPAs).

Because of the limitation on the power available for transmission of the data structure 200, the communications system of the MEO satellites 102–124 can only support approximately 4500 telephone circuits simultaneously by sharing the 700 W RF radiation among the communications signals 220–230 that are to be transmitted back to earth 130. Each signal 220–230 requires 0.156 W radiated RF power in the MEO satellite 102–124 downlink signals.

Although there are typically four hundred and ninety subbands 218 available on a MEO satellite 102–124, approximately one hundred and twenty-five of the subbands 218 are available for voice and low speed data transport purposes because of power limitations in the MEO satellite 102–124 and frequency coordination with other MEO satellites 102–124. Of these one hundred and twenty five subbands 218, a percentage of the available subbands 218 will be unavailable in a given earth 130 geographical area because of interference between one MEO satellite 102–124 and another MEO satellite 102–124 on a given channel 220–230 used by a single user, because that user effectively blocks the channel 220–230 from all MEO satellites within that user's FOV.

MEO satellites typically only provide telephone and other Low Data Rate (LDR) services to customers. However, as shown above, some channels on MEO satellites 102–124, although available and can be delivered to a geographical earth 130 location, are not utilized. The present invention employs intelligence in the system management of the constellation 100 to enable those unused channels 220–230 to be utilized by a different class of users without sacrificing the use of the channels 220–230 by LDR users.

Although described with respect to two classes of service, e.g., LDR and Medium Data Rate (MDR), the technique of the present invention can be extended to additional classes of service, e.g., High Data Rate (HDR), Very Low Data Rate (VLDR), and other additional services simultaneous with LDR and MDR service.

Although LDR service can consume all of the available power generated by a typical MEO satellite 102–124 (e.g., 700 W) as described above, all of the available subbands 218 are not utilized in the constellation 100. In order to utilize the allocated power and available subbands 218 more efficiently in terms of both cost and data throughput, the present invention utilizes a second data rate service, called "MDR service," within constellation 100. The MDR service can provide, for example, 144 kbps connectivity to mobile users with high gain directional antennas which can provide a higher power density signal to MEO satellites 102–124.

Multiple Data Rate Service Scenario

Figure 3:
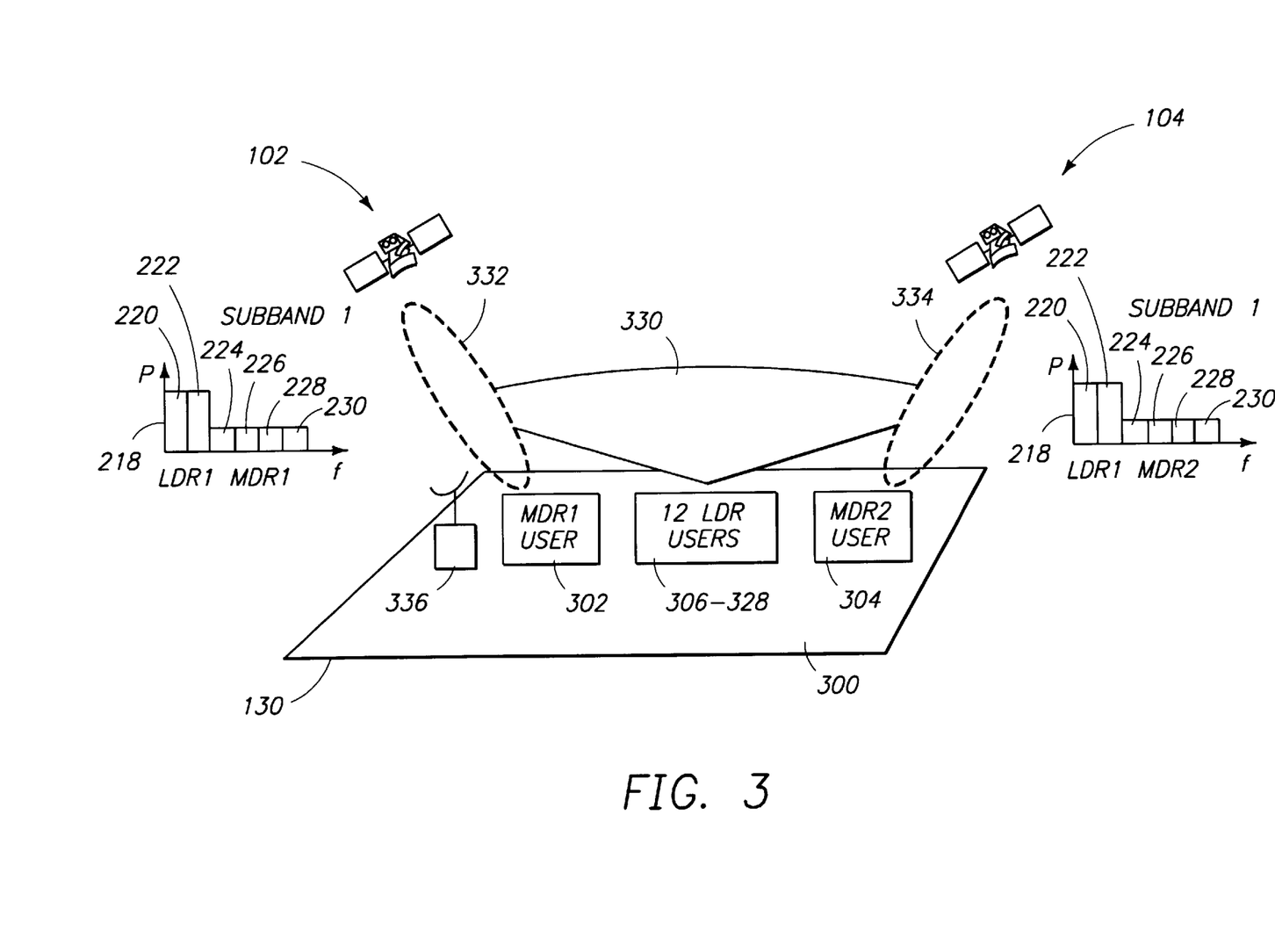
FIG. 3 illustrates a multiple data rate service scenario utilizing the present invention.

FIG. 3 illustrates a multiple data rate service scenario utilizing the present invention.

FIG. 3 illustrates two MEO satellites 102 and 104, that are visible from a geographic earth 130 region 300. Within that geographic region 300, there are, as an example, fourteen communications services users, namely, MDR1 user 302, MDR2 user 304, and twelve LDR users 306–328.

The fourteen communications services users, MDR1 user 302, MDR2 user 304, and the twelve LDR users 306–328 are all using the MEO satellite subbands 218 simultaneously. As shown, the 12 LDR users 306–328 are sharing two channels of subband 218, namely channels 220 and 222. Because the 12 LDR users 306 and 328 have a FOV 330 that covers both MEO satellite 102 and MEO satellite 104, only one MEO satellite 102 or 104 can utilize channels 220 and 222 for communications purposes, because utilization of channels 220 and 222 from both MEO satellite 102 and MEO satellite 104 would create interference for LDR users 306–328. As shown in FIG. 3, MEO satellite 104 radiates RF signals for the LDR users 306–328.

Although MEO satellites 102 and 104 are both visible to MDR1 user 302 and MDR user 304, MDR1 user 302 utilizes an antenna that restricts the FOV 332 of MDR1 user 302 to only be able to see MEO satellite 102, and MDR2 user 304 utilizes an antenna that restricts the FOV 334 of MDR2 user 304 to only be able to see MEO satellite 104. As MEO satellite 102 traverses the FOV 332 of MDR1 user 302, the antenna will track MEO satellite 102 to maintain the communications link between MDR1 user 302 and MEO satellite 102. As MEO satellite 102 disappears from view of MDR1 user 302, the antenna of MDR1 user 302 will acquire another MEO satellite, e.g., 112, and track the motion of MEO satellite 112, to maintain the communications link between MDR1 user 302 and whatever MEO satellite 102–124 is capable of delivering communications services to MDR1 user 302. Similar functions are performed by MDR2 user 304.

The antennas used by MDR1 user 302 and MDR2 user 304 have restricted beamwidths, e.g., FOV 332 and FOV 334. These reduced beamwidths provide not only directionality to an individual MEO satellite 102 or 104 in constellation 100, but allow MEO satellites 102 and 104 to both utilize channels 224–230 of subband 218 simultaneously without substantial interference. MDR1 user 302 utilizes channels 224–230 at a given frequency subband 218 to communicate with MEO satellite 102; at the same time, MDR2 user 304 utilizes channels 224–230 of the same frequency subband 218 to communicate with MEO satellite 104; simultaneous with those communication links, LDR users 306–328 are using channels 220–222 of the same frequency subband 218 to communicate with MEO satellite 104. There is no substantial interference between the communications between MEO satellite 102 and MDR1 user 302 and the communications between MEO satellite 104 and MDR2 user 304, nor is there any substantial interference between the MDR users 302–304 communications and the LDR users 306–328 communications. Substantial interference is defined as interference that would not allow both communications to occur without significant errors in data and/or crosstalk interference between the two communications links.

This simultaneous use of channels 224–230 at the same frequency subband 218 for two MEO satellites 102–104 that are in simultaneous view of a region 300 allows the constellation 100 to support additional data throughput without additional power requirements for any MEO spacecraft 102–124 within the constellation 100. This allows constellation 100 to generate additional data streams, and, as such, additional revenue for the satellite owner/operator which enables the satellite owner/operator to lower costs of providing services to users 302–328, and/or provide additional services to users 302–328.

Further, although channels 218–222 of MEO satellite 102 are shown as unused, channels 218–222 from MEO satellite 102 can be radiated at a lower signal strength (power) to users 336 that have higher gain antennas within region 300. The lower signal strength radiation will not interfere with LDR users 306–328 because the LDR user 306–328 receivers will not be able to detect the lower power radiated signals, and will not interfere with MDR1 user 302 or MDR2 user 304 because of the difference in frequency. This complete reuse of the channels 220–230 of MEO satellites 102 and 104 that are visible from the same region 300 on earth 130 provides additional cost savings and data throughput not currently available.

Certain constellations 100 and/or certain users 302, 304, and 336 may not be able to utilize the directional diversity present in the present application, because the MEO satellites 102 and 104 are not spatially diverse enough to avoid the interfering FOV. For example, as shown in FIG. 3, if MEO satellites 102 and 104 were not spatially diverse enough to allow FOV 332 and FOV 334 to only see one MEO satellite 102 or 104, the diversity arrangement of the present invention would not be available, either in that region 300 or during that time period of the orbit 128. As the number of MEO satellites 102–124 in constellation 100 increases, more MEO satellites 102–124 will be within a given FOV, i.e., FOV 332. However, since there will be more satellites within both FOVs 332 and 334, the antenna systems of MDR1 user 302 and MDR2 user 304 can be directed by constellation 100 to point to the MEO satellites 102 and 104 that are the most spatially diverse within the constellation to overcome such limitations. Further, the FOV 332 and 334 can vary by region 300, depending on where the region 300 is on the surface of Earth 1130. Some regions 300 will be able to see more MEO satellites 102–124 than others, and, as such, these regions will have additional available service when employing the present invention.

System Parameters

Within constellation 100, the total RF power on each MEO satellite 102–124 associated with non-LDR users, e.g., MDR1 user 302, is highly dependent on the directionality and the antenna gain located at the non-LDR user locations. If sufficient directionality and antenna gain are present, then the channels 220–230 can use lower power density per channel 220–230 for non-LDR users 302, 304, and 336. For example, the signals for MDR channels 220–230 can be designed to spread over an entire subband 218 or multiple subbands 218 via CDMA schemes. This is one of the advantages of using CDMA techniques.

To determine the cost feasibility for MEO satellites 102–124, and to determine the cost feasibility for the number of MEO satellites 102–124 that should be placed into constellation 100, the gain and directionality of the ground terminals used at MDR1 user 302, MDR2 user 304, and user 336 must be determined. As an example, the cost feasibility will change depending on the gain of the MDR antenna. Table 1 illustrates two types of antennas for use with MDR service; one antenna has a 10 dB directional gain, while the alternate antenna has a 15 dB directional gain.

To illustrate the revenue sensitivity generated by the LDR service and the MDR service on a MEO satellite 102–124, the service fee for a LDR user (4 kbps) with a handset is assigned to be $1.00 per minute, and the service fee for a MDR user (144 kbps) with a high gain terminal is $4.00 per minute. Other service fees can be assigned to each class of service, and, accordingly, the optimal operation point will change depending on the rates charged.

Given these price assumptions, the price to transfer 1 megabit (MB) of data via the LDR service will cost an LDR user 306 $4.167, and the price to transfer 1 MB of data will cost MDR1 user 302 $0.463. A LDR user 306 consumes 0.156 Watt of RF power on board the MEO satellite 102, while a MDR1 user 302 using a 10 dB antenna uses 0.560 Watts of MEO satellite 102 power. If the MDR1 user 302 has a 15 dB antenna, the MEO satellite 102 only has to expend 0.177 Watts of RF power.

For illustration purposes, MDR1 user 302 and MDR2 user 304 will be shown throughout the remainder of the application to comprise 15 dB gain antennas unless otherwise noted.

System Operational Capabilities

Figure 4:
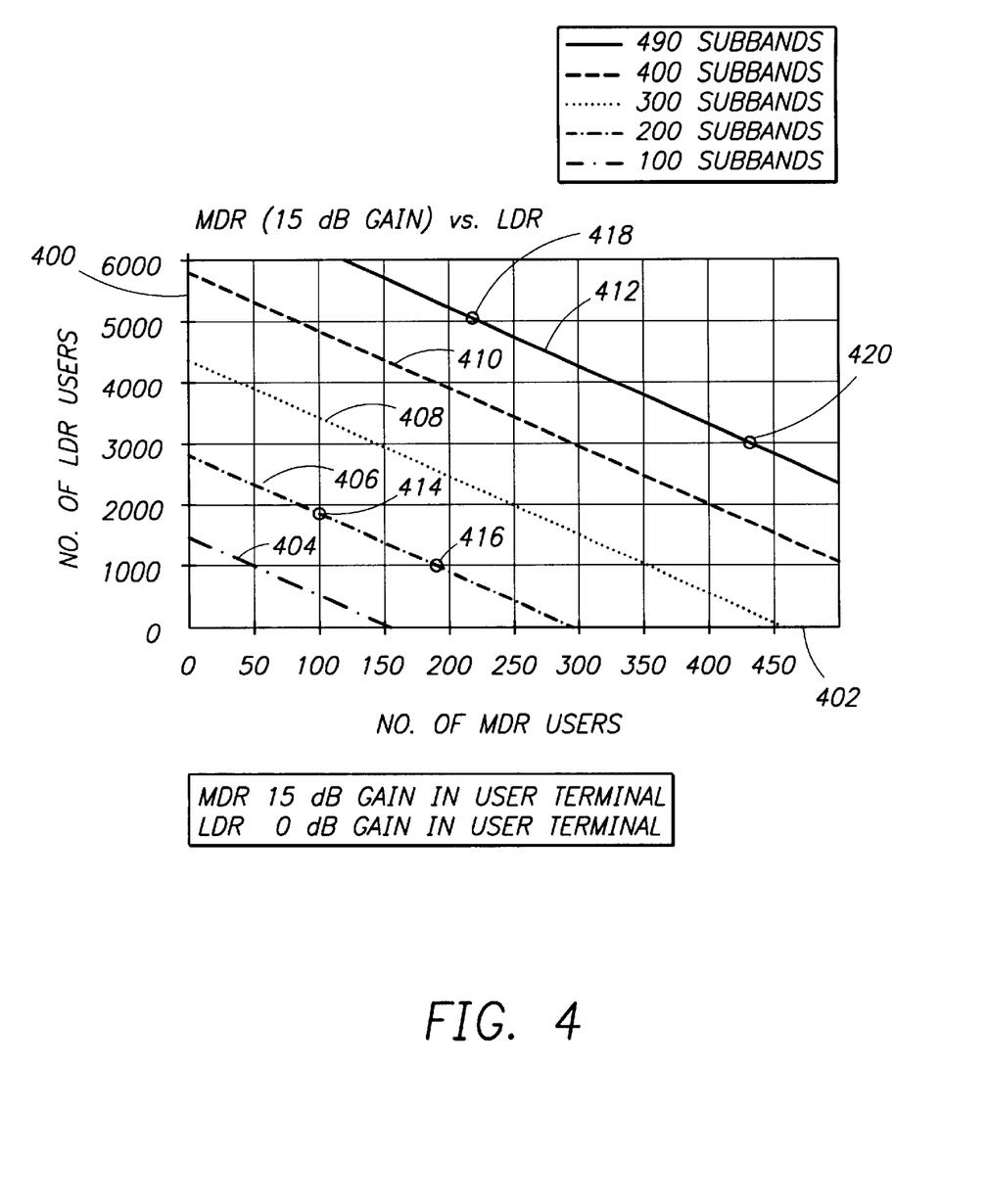
FIG. 4 is a graph illustrating the number of LDR users versus the number of MDR users a typical MEO satellite can support using the present invention.

FIG. 4 is a graph illustrating the number of LDR users versus the number of MDR users a typical MEO satellite can support with the subband (bandwidth) constraint but without the power constraint using the present invention.

To determine the number of users a given MEO satellite 102–126 can support simultaneously, a family of parametric lines for available subbands 218 that are shared by the LDR users 306–328 and other users, e.g., MDR1 user 302, MDR2 user 304, and user 336, will calculate the maximum number of simultaneous users. For a two distinct class service example as described with respect to LDR/MDR service, FIG. 4 illustrates the family of parametric lines. Vertical axis 400 indicates the numbers of simultaneous LDR users 306–328, while horizontal axis 402 illustrates the number of simultaneous MDR users 302–304. The family of parametric lines includes five distinct lines 404–412. Line 404 corresponds to a MEO satellite 102 having one hundred subbands 218 available for usage. Line 406 corresponds to a MEO satellite 102 having two hundred subbands 218 available for usage. Line 408 corresponds to a MEO satellite 102 having three hundred subbands 218 available for usage. Line 410 corresponds to a MEO satellite 102 having four hundred subbands 218 available for usage. Line 412 corresponds to a MEO satellite 102 having four hundred and ninety subbands 218 available for usage.

For example, line 406 indicates that a MEO satellite 102 having two hundred available subbands 218 can support either 300 MDR users 302–304, or about 2,900 LDR users 306–328, but not simultaneously. Point 414 on line 406 illustrates that the same MEO satellite 102 can simultaneously support a mixed service with about one hundred MDR users 302–304 and 1,900 LDR users 306–328. Point 416 on line 406 illustrates that the same MEO satellite 102, can simultaneously support a mixed service of approximately one hundred and ninety MDR users 302–304 and one thousand LDR users 306–328.

Line 412 is the parametric line for a MEO satellite 102 with four hundred and ninety subbands 218 available for service. Point 418 on line 412 indicates that such a MEO satellite 102 can simultaneously serve 5,000 LDR users 306–328 and two hundred and fifteen MDR users 302–304. Point 420 on line 412 indicates that the same MEO satellite 102 with four hundred and ninety subbands 218 can simultaneously support approximately four hundred and thirty MDR users 302–304 and 3,000 LDR users 306–328. The only constraint on the parametric lines on FIG. 4 is the number of available subbands 218. However, the MEO satellites 102–124 are limited by power constraints as to how many subbands 218 the MEO satellites 102–124 can simultaneously support.

Figure 5:
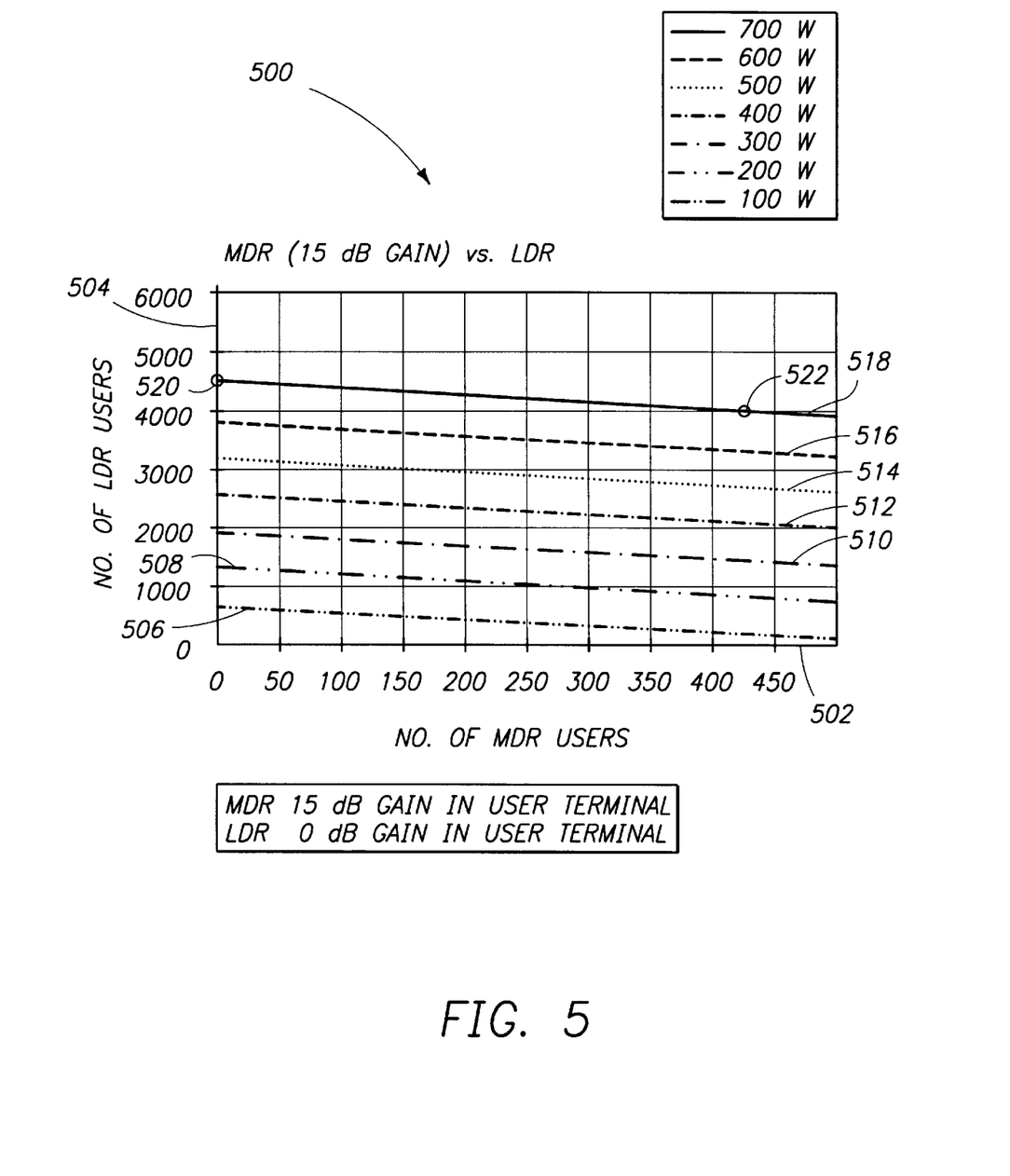
FIG. 5 illustrates a parametric family of lines for a MEO satellite that constrains the number of users by available power.

FIG. 5 illustrates a parametric family of lines for a MEO satellite that constrains the number of users by available power.

Since MEO satellites 102–124 are power limited and not subband 218 limited, FIG. 5 illustrates the number of simultaneous LDR users 306–328 and MDR users 302–304 that the RF power of MEO satellite 102 can support. Parametric family 500 of curves shows horizontal axis 502 as the number of simultaneous MDR users 302–304, each using 15 dB antennas, and vertical axis 504 shows the number of simultaneous LDR users 306–328.

Line 506 illustrates the number of simultaneous LDR users 306–328 and MDR users 302–304 that MEO satellite 102 can support if MEO satellite 102 has one hundred watts of RF power available. Similarly, line 508 illustrates the number of simultaneous LDR users 306–328 and MDR users 302–304 that MEO satellite 102 can support if MEO satellite 102 has two hundred watts of RF power available. Line 510 illustrates the number of simultaneous LDR users 306–328 and MDR users 302–304 that MEO satellite 102 can support if MEO satellite 102 has three hundred watts of RF power available. Similarly, line 512 illustrates the number of simultaneous LDR users 306–328 and MDR users 302–304 that MEO satellite 102 can support if MEO satellite 102 has four hundred watts of RF power available.

Line 514 illustrates the number of simultaneous LDR users 306–328 and MDR users 302–304 that MEO satellite 102 can support if MEO satellite 102 has five hundred watts of RF power available. Similarly, line 516 illustrates the number of simultaneous LDR users 306–328 and MDR users 302–304 that MEO satellite 102 can support if MEO satellite 102 has six hundred watts of RF power available. Finally, line 518 illustrates the number of simultaneous LDR users 306–328 and MDR users 302–304 that MEO satellite 102 can support if MEO satellite 102 has the typical seven hundred watts of RF power available. Point 520 on line 518 indicates that the same MEO satellite 102 with four hundred and ninety subbands 218 and seven hundred watts of power available can support 4500 simultaneous LDR users 306–328, while point 522 shows that the same MEO satellite 102 can support 4000 LDR users 306–328 simultaneous with 440 MDR users 302–304.

Figure 6:
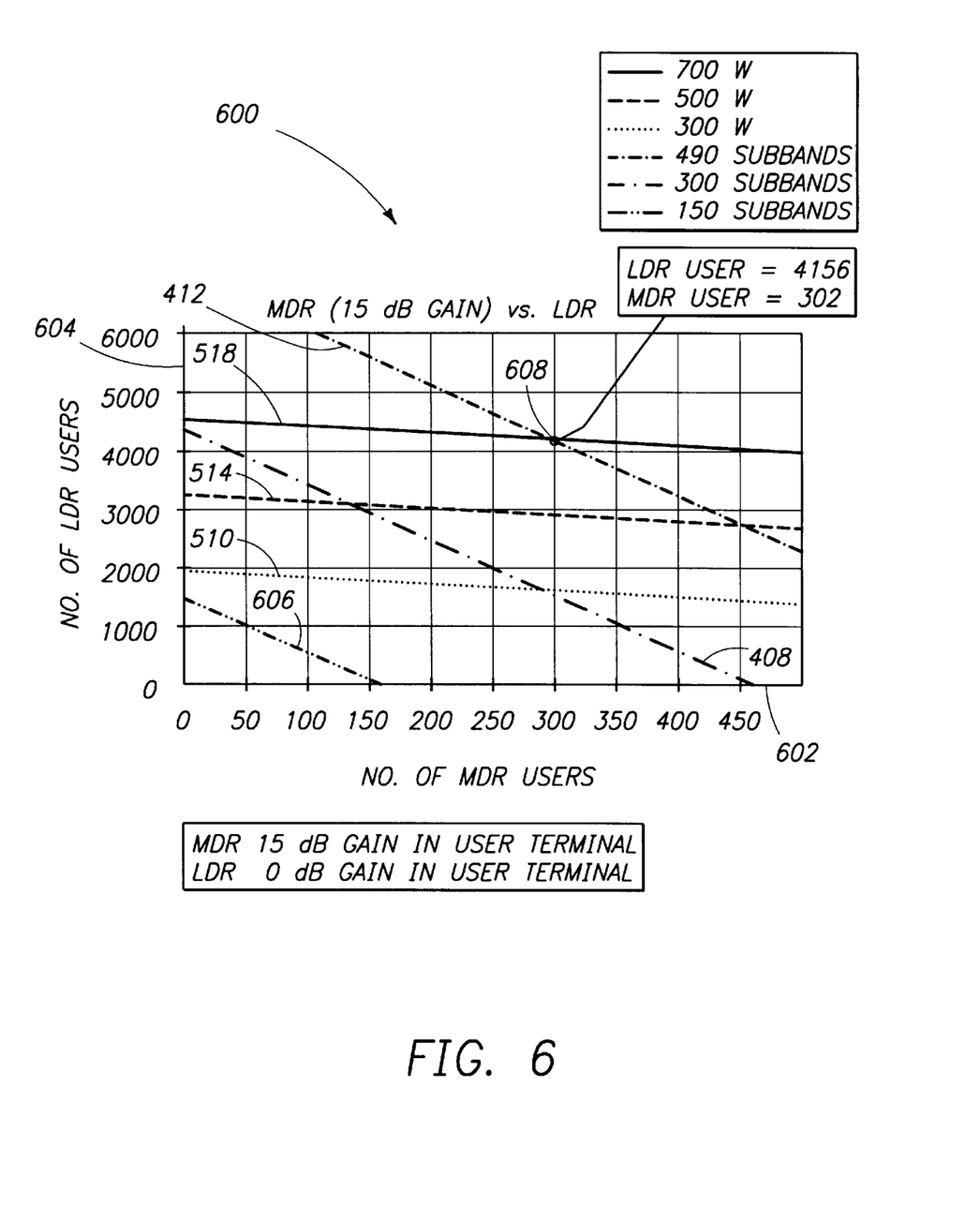
FIG. 6 illustrates the merging of the parametric spaces described in FIGS. 4 and 5 to describe the techniques of the present invention.

FIG. 6 illustrates the merging of the parametric spaces described in FIGS. 4 and 5 to describe the techniques of the present invention with both power and bandwidth constraints.

By overlaying the two parametric lines of FIGS. 4 and 5 together as illustrated in FIG. 6, operational space 600 is generated for the LDR and MDR services using the combined resource constraints of RF power and numbers of available subbands 218.

Horizontal axis 602 again shows the number of simultaneous MDR users 302–304, and vertical axis 604 shows the number of simultaneous LDR users 306–328. Lines 510, 514, and 518 illustrate various power availabilities for typical MEO satellites 102–124, and lines 408, 412, and 606 illustrate the various numbers of subbands 218 available on typical MEO satellites 102–124.

Point 608 represents the intersection of line 412 with line 518, which shows that for a 700 W RF radiated power MEO satellite 102 that has four hundred and ninety subbands, the MEO spacecraft can support a maximum number of simultaneous users, e.g., 4,156 LDR users 306–328 and 302 MDR users 302–304. Other locations on the two-dimensional operational space 600 specify uniquely the numbers of concurrent LDR users 306–328 and MDR users 302–304 sharing the same subbands 218.

The operational space 600 shown in FIG. 6 is a static representation of how many users can be supported. The present invention can also employ dynamic reallocation of subbands 218, RF power, or other space assets resident on MEO satellites 102–124 to change the operational space 600. For example, depending on the usage for a given geographic region, additional MDR users 302–304 could be supported for a certain time period when additional MEO spacecraft 102–124 are visible to the region. Further, depending on the revenue generated by LDR users 306–324 and MDR users 302–304, the cost to deliver LDR and MDR service through constellation 100 will decrease.

As the number of different applications (data rates or services) provided by MEO satellites 102–124 increases, the operational space 600 will become multi-dimensional, e.g., if MEO satellite 102 supports three data rates, then the operational space will become three-dimensional, etc. Once the number of applications increase, parametric lines 404–412 and 506–518 will become surfaces. The determination of the optimum operational point can be determined in a number of ways, including taking into account the cost to deliver the services, revenue generated by the services, available power, available subbands 218, bandwidth required to deliver the services, and other parameters.

Determination of Efficient Operational States

Figure 7:
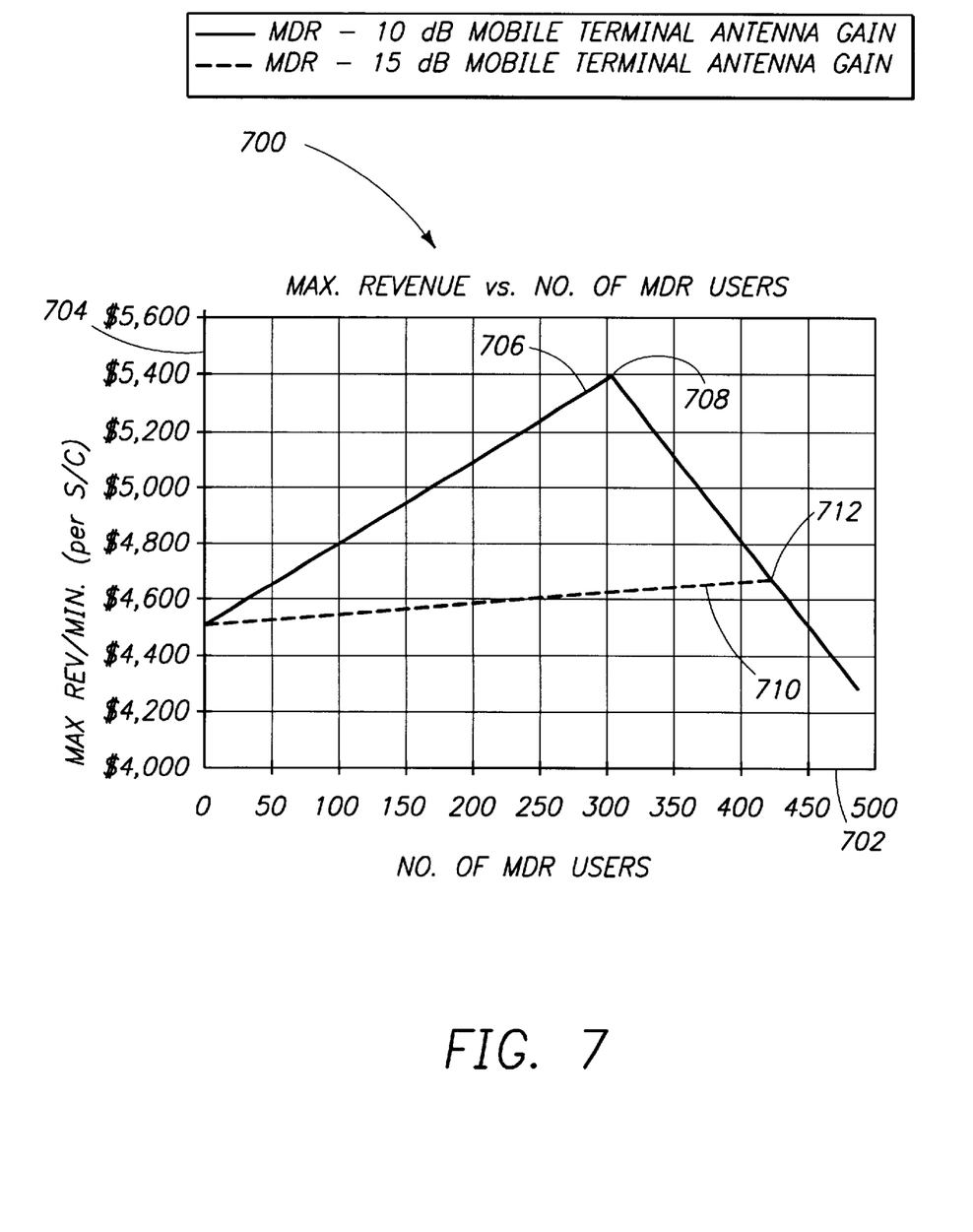
FIG. 7 illustrates a determination of efficiency for MEO satellite operation utilizing the techniques of the present invention.

FIG. 7 illustrates a determination of efficiency for MEO satellite operation utilizing the techniques of the present invention.

One method for determining the maximum efficiency for a MEO satellite 102–124 is to maximize the revenue generated by MEO satellites 102–124. Although this example is presented herein, there are other methods for increasing the efficiency of operating MEO satellites 102–124. These methods include minimizing excess bandwidth, shifting power from one class of service to another, e.g., LDR services to MDR services, determining the number of users in a certain region 300 on the earth 130 and dynamically allocating subbands 218 to service the users in that region 300, and other methods. The example presented below is one of a number of methods that can be used to increase the efficiency of operating MEO satellites 102–124.

As shown in FIG. 7, revenue space 700 is generated by plotting the number of MDR users 302–304 on horizontal axis 702 vs. the maximum revenue per minute for MEO satellite 102 on vertical axis 704. The assumptions for the revenue space 700 are that LDR users 306–328 pay $1.00 per minute, whereas MDR users 302–304 pay $4.00 per minute to use the space assets on the MEO satellite 102. If MEO satellite 102 were to only support LDR users 306–328, the revenue space 700 would be a horizontal line at $4500.00, because MEO satellite 102 can support a maximum of 4500 simultaneous LDR users 306–328.

However, once MDR users 302–304 can be supported by MEO satellite 102 using the present invention, additional revenue can be generated by MEO satellite 102. This additional revenue can be used to increase profits to the MEO satellite 102 owner/operator, or to reduce the costs to LDR users 306–328 and MDR users 302–304, because a breakeven point can be determined using revenue space 700.

Revenue line 706 shows a graph of revenue generated by MEO satellite 102 based on the number of simultaneous MDR users 302–304 using a 15 dB antenna that MEO satellite 102 is servicing. Point 708 on revenue line 706 shows that the maximum revenue generated by MEO satellite 102 is at approximately 302 MDR users 302–304, which corresponds to point 608 in FIG. 6. However, as the charges for LDR and MDR services change, the optimal operational point in revenue space 700 can change. Point 708 illustrates that MEO satellite 102 can now generate approximately $5400.00 per minute with no change in space assets, which is an increase in revenue of $900.00 per minute. This increase in revenue can be used to lower costs to LDR and MDR users 302–328, determine breakeven points for satellite constellations 100, and other cost analysis tools.

Revenue line 710 illustrates the revenue generated for a MEO satellite 102 that communicates with MDR users 302–304 using a 10 dB gain directional antenna instead of a 15 dB gain directional antenna. As seen in FIG. 7, the maximum revenue at point 712 changes the number of simultaneous MDR users 302–304 to over four hundred, while increasing revenue to approximately $4,650.00 per minute. This occurs because MDR users 302–304 that only have 10 dB gain directional antennas consume 3 times more RF power (5 dB) than an MDR user 302–304 using a 15 dB gain directional antenna, which generates revenue line 706, but both users are charged the same $4.00 per minute for MDR service usage.

Depending on the operational constraints of the communications system, the techniques of the present invention will aid MEO satellite 102 owners/operators in determining how best to use the space assets available on MEO satellites 102. As shown in FIG. 7, MEO satellite 102 owner/operators may not be able to generate profits from a MEO satellite 102 that can only generate $4500.00 per minute to be able to afford to launch the constellation 100. However, by increasing the efficiency of the space assets on board the MEO satellite 102 to $5400.00 per minute, the breakeven point may now allow MEO satellite 102 owners/operators to launch constellation 100, or allow MEO satellite 102 owners/operators to maintain service.

Further, revenue space 700 assists MEO satellite 102 operators during the design phase of new constellations 100. A constellation 100 designed to provide enough profit based on revenue line 710 may be able to provide LDR and MDR service at lower costs if revenue line 706 is used. Revenue space 700, and other increased efficiency techniques as described with respect to FIGS. 4–6, will provide additional design tools to support constellations 100 not previously thought financially feasible, as well as providing important tools to determine what to charge for the LDR and MDR services in order to make multiple data rate services financially viable. Further, revenue space 400 can be used to determine how many simultaneous users of multiple data rate services can be supported for a fixed revenue cost, e.g., a horizontal line at $4,500.00 per minute. As an example, this revenue rate can be supported by a MEO satellite 102 that supports 4,500 simultaneous LDR users 306–324 alone, or a combination of 3,000 LDR users 306–324 and 375 MDR users 302–304, or a combination of 2,700 LDR users 306–324 and 450 MDR users 302–304. As can be seen, the number of users within a region 300 on the earth 130 can be dynamically altered to maintain a minimum, fixed, or maximum operational efficiency point 708.

Flowchart

Figure 8:
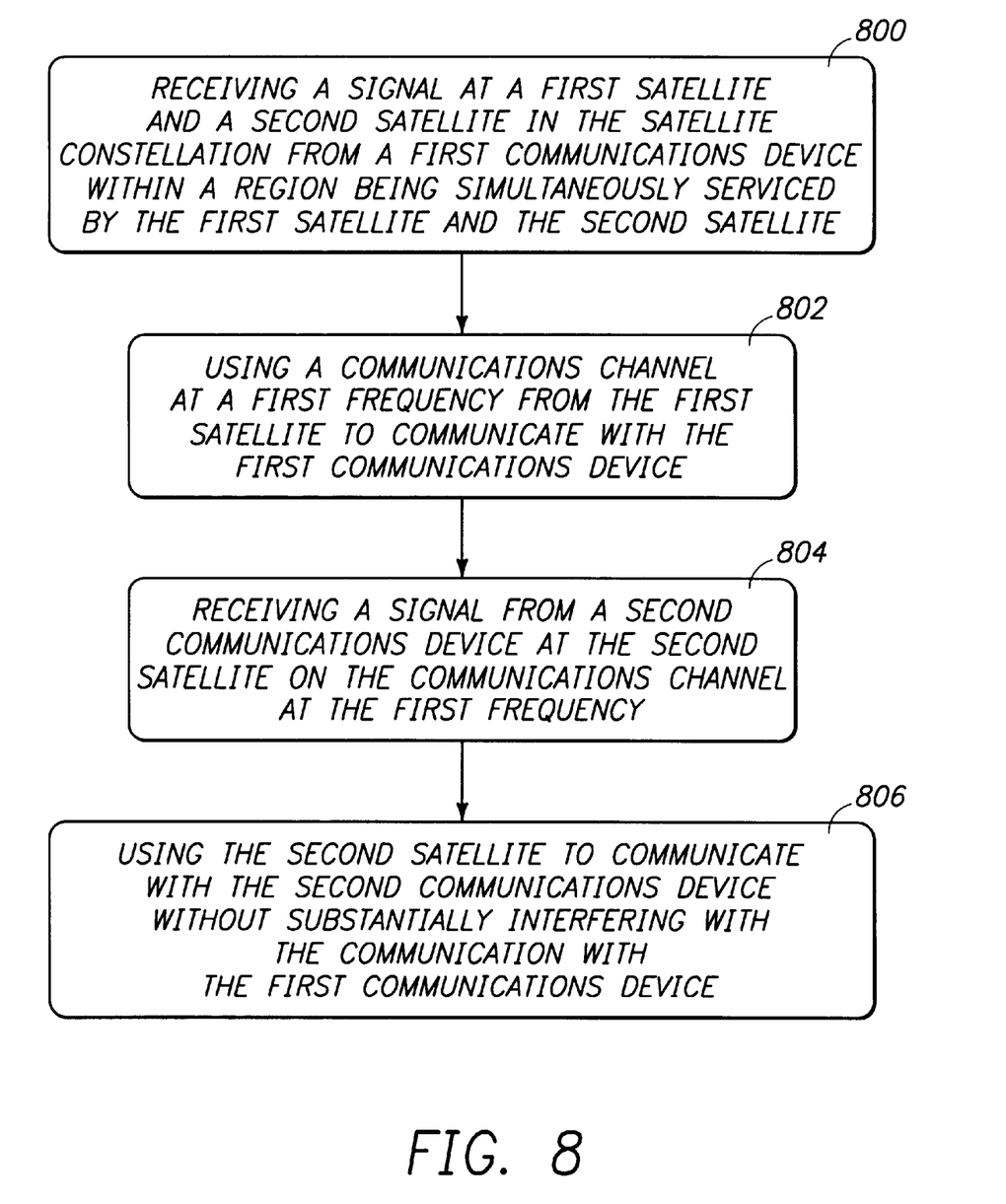
FIG. 8 is a flow chart illustrating the steps used in practicing one embodiment of the present invention.

FIG. 8 is a flowchart illustrating the steps used to practice the present invention. Although only two MEO satellites 102–104 are discussed, the present invention will operate with a constellation 100 using any number of MEO satellites 102–104 within the same FOV.

Block 800 illustrates the present invention performing the step of receiving a signal at a first satellite and a second satellite in the satellite constellation from a first communications device within a region, the region being simultaneously serviced by the first satellite and the second satellite.

Block 802 illustrates the present invention performing the step of using a communications channel at a first frequency from the first satellite to communicate with the first communications device.

Block 804 illustrates the present invention performing the step of receiving a signal from a second communications device only at the second satellite on the communications channel at the first frequency.

Block 806 illustrates the present invention performing the step of using the second satellite to communicate with the second communications device without substantially interfering with the first communications device.

CONCLUSION

This concludes the description of the preferred embodiment of the invention. The following paragraphs describe some alternative methods of accomplishing the same objects and some additional advantages for the present invention.

Although discussed with respect to radio frequency transmissions, the above-described invention can also be used with optical or other information carrying transmission systems to perform the same or similar functions. Further, although described with regard to MEO satellites 102–124, the present invention can be utilized for LEO, GEO, or other orbital dynamic scenarios without departing from the scope of the present invention.

The techniques described in the present invention can be used to make rural mobile telephone service economically feasible, as well as the ability to utilize present satellite configurations 100 to accomplish this task. Further, the techniques described in the present invention can be utilized to optimize the locations and the numbers of MEO satellites 102–124 in constellation 100 to properly service users 302–328.

In summary, the present invention provides methods for increasing the efficiency of satellite operations. The steps of the present invention comprise receiving a signal at a first satellite and a second satellite in the satellite constellation from a first communications device within a region, the region being simultaneously serviced by the first satellite and the second satellite, using a communications channel at a first frequency from the first satellite to communicate with the first communications device, receiving a signal from a second communications device at the second satellite on the communications channel at the first frequency, and using the second satellite to communicate with the second communications device without substantially interfering with the first communications device.

The foregoing description of the preferred embodiment of the invention has been presented for the purposes of illustration and description and is not intended to be exhaustive or to limit the invention to the precise form disclosed. Many modifications and variations are possible in light of the above teaching. It is intended that the scope of the invention be limited not by this detailed description, but rather by the claims appended hereto.

TABLE 1

| DATA RATE TYPE | MOBILE TERMINAL ANT. GAIN (dB) | kbps | BANDWIDTH/ USER (kHz/user) | NO. OF SUBBAND/ USER* | S/C POWER/ USER (watt/user) | $/min Assumptions | COST PER Mbits ($/Mbits) |
|---|---|---|---|---|---|---|---|
| LDR | 0 | 4 | 4.17 | 0.07 | 0.156 | $1.00 | 4.167 |
| MDR(1) | 10 | 144 | 150 | 0.67 | 0.560 | $4.00 | 0.463 |
| MDR(2) | 15 | 144 | 150 | 0.67 | 0.177 | $4.00 | 0.463 |

MAXIMUM REVENUE PER MINUTE FROM LDR SERVICES PER S/C = $1.00 * 4,500 USERS = $4,500

What is claimed is:

1. A method for operating a communications satellite constellation, comprising:

receiving a first signal at a first data rate at a first satellite and a second satellite in the satellite constellation from a first communications device within a region, the region being simultaneously serviced by the first satellite and the second satellite;

using a first communications channel to communicate a second signal at a second data rate different than the first data rate from the first satellite to a second communications device within the region; and using the first communications channel to communicate a third signal at the second data rate from the second satellite to a third communications device within the region without substantially interfering with the communications with the first communications device.

2. The method of claim 1, wherein the first satellite and the second satellite are in Middle Earth Orbit (MEO).

3. The method of claim 1, wherein the signal from the second communications device comprises a higher power density than the signal from the first communications device.

4. The method of claim 1, wherein the step of using the first communications channel to communicate a third signal at the second data rate from the second satellite to a third communications device within the region without substantially interfering with the communications with the first communications device comprises the step of using a lower power density signal from the second satellite to communicate with the second communications device.

5. The method of claim 1, wherein the step of using the first communications channel to communicate a third signal at the second data rate from the second satellite to a third communications device within the region without substantially interfering with the communications with the first communications device comprises the step of using spatial diversity to communicate with the second communications device.

6. A method for operating a satellite at an increased efficiency, comprising the steps of:
   calculating the maximum number of communications signals that the satellite can generate for a first communications service;
   determining an operational constraint on the satellite, the operational constraint limiting the number of communications signals that the satellite can radiate substantially simultaneously;
   defining a second communications service, the second communications service using the same communications signals as the first communications service;
   determining, using the operational constraint and an operational space, the increased efficiency for the communications signals, the operational space defined using the first and the second communications services;
   determining a limit on the increased efficiency using the operational constraints;
   determining an operational point for the satellite using the limited increased efficiency;
   operating the satellite at the operational point.

7. The method of claim 6, wherein the operational point increases the use of transponder bandwidth.

8. The method of claim 6, wherein the operational constraints are selected as one or more elements selected from a group comprising power limitation, available subbands, available channels, and data rate requirements.

9. The method of claim 6, wherein the increased efficiency operational point is determined using at least one element selected from a group comprising revenue generation, bandwidth availability, available power, number of users within a region, and available subbands.

10. The method of claim 6, wherein the step of defining the second communications service includes defining a different data rate for the second communications service.

11. A method for increasing the efficiency of usage for a satellite space asset, comprising the steps of:
    dynamically determining an amount of the satellite space asset that is available at a current operational point;
    determining the limits of usage of the satellite space asset using operational constraints;
    dynamically creating an operational space for the satellite space asset wherein the operational space is defined using the availability of the satellite space asset and the operational constraints;
    determining an increased efficiency operational point for the satellite space assets within the operational space, wherein the increased efficiency operational point for the based on the limiting step; and
    operating the satellite space asset at the increased efficiency operational point.

12. The method of claim 11, wherein the satellite space asset is selected from a group comprising transponder bandwidth and subbands.

13. The method of claim 11, wherein the operational constraints are selected as one or more elements selected from a group comprising power limitation, available subbands, available channels, and data rate requirements.

14. The method of claim 11, wherein the increased efficiency operational point is determined using at least one element selected from a group comprising revenue generation, bandwidth availability, available power, number of users within a region, and available subbands.

15. The method of claim 11, wherein the step of creating the operational space comprises the steps of generating a different usage for the satellite space asset and including the different usage of the satellite space asset in the creating step.

16. The method of claim 11, wherein the step of determining the increased efficiency operational point for the satellite space assets comprises the step of allocating a frequency subband of the satellite space asset to support a first application and a second application substantially simultaneously.

17. The method of claim 11, wherein the step of determining the increased efficiency operational point for the satellite space assets is determined by a region of service.

18. A method for operating a communications satellite constellation, comprising:
    receiving a first signal at a first data rate at a first satellite from a first communications device within a region,
    receiving a second signal at the first data rate at a second satellite in the satellite constellation from a second communications device within the region;
    using a first communications channel to communicate a third signal at a second data rate higher than the first data rate from the first satellite to a third communications device; and
    using the first communications channel to communicate a fourth signal at the second data rate from the second satellite to a fourth communications device within the region without substantially interfering with the communications with the first communications device, the second communications device, and the third communications device.

19. The method of claim 18, wherein the step of using the first communications channel to communicate a fourth signal at the second data rate from the second satellite to a fourth communications device within the region without substantially interfering with the communications with the first communications device, the second communications device, and the third communications device comprises the step of using spatial diversity.

20. The method of claim 18, wherein the third and fourth signals comprise a higher power density than the first and second signals.

21. The method of claim 1, wherein the second data rate is higher than the first data rate.

22. A method of communicating information, comprising the steps of:
    communicating a first signal from one of a plurality of satellites to one or more of a first set of communications devices disposed within a region at a first data rate using one of a first set of one or more channels;
    communicating a second signal from the one of the plurality of satellites to a first of a second set of communications devices disposed within the region at a second data rate higher than the first data rate using a first of a second set of one or more channels; and communicating a third signal from another of the plurality of satellites to a second of the second set of communications devices disposed within the region at the second data rate using the first of the second set of one or more channels.

23. The method of claim 22, wherein the first, second and third signals are communicated simultaneously.

24. The method of claim 23, wherein each of the first, second and third signals are communicated without substantially interfering with the other of the first, second, and third signals.

25. The method of claim 24, wherein the first of the second set of communications devices is spatially diverse from the second of the second set of communications devices.

26. The method of claim 24, wherein:

the first set of communications devices each include an antenna having a first beamwidth; and the second set of communications devices each include an antenna having a second beamwidth more restricted than the first beamwidth.

27. The method of claim 24, wherein:

the first beamwidth is disposed to receive signals from more than one of the plurality of satellites; and the second beamwidth is disposed to receive signals from only one of the plurality of satellites.

28. The method of claim 24, wherein:

the first signal is of greater signal strength than the second signal and the third signal;

the first set of communications devices each include an antenna having a first gain; and the second set of communications devices each include an antenna having a second gain greater than the first gain.

29. A method of communicating information, comprising the steps of:

communicating a first signal having a first signal strength from one of a plurality of satellites to one or more of a first set of communications devices coupled to a first antenna having a first gain disposed within a region using one of a first set of one or more channels; and communicating a second signal having a second signal strength less than the first signal strength from the one of the plurality of satellites to one or more of a second set of communications devices using the one of the first set of one or more channels, said one or more of the second set of communication devices each comprising a second antenna having a second gain greater than the first gain disposed within the region.

30. The method of claim 29, wherein the first signal and the second signal are communicated simultaneously.

31. The method of claim 30, wherein the second signal strength is undetectable by the first set of communications devices and detectable by the second set of communications devices.

32. The method of claim 29, further comprising the steps of:

communicating a third signal from another one of the plurality of satellites to another of the second set of communications devices disposed within the region, the another of the second set of communications devices comprising a third antenna having the second gain.

33. The method of claim 29, wherein:

the first antenna has a first beamwidth;

the second antenna has a second beamwidth more restricted than the first beamwidth.

34. The method of claim 29, wherein the plurality of satellites are in Middle Earth Orbit.

* * * * *